United States Patent [19]

Bose

[11] Patent Number: 5,649,063
[45] Date of Patent: Jul. 15, 1997

[54] FEEDBACK PROCESS CONTROL USING A NEURAL NETWORK PARAMETER ESTIMATOR

[75] Inventor: Chinmoy Bhusan Bose, Green Brook, N.J.

[73] Assignee: Lucent Technologies Inc., Murray Hill, N.J.

[21] Appl. No.: 358,049

[22] Filed: Dec. 16, 1994

Related U.S. Application Data

[63] Continuation of Ser. No. 134,703, Oct. 12, 1993, abandoned.
[51] Int. Cl.⁶ .................................................. G06F 15/18
[52] U.S. Cl. ............................ 395/22; 395/23; 395/903; 395/906
[58] Field of Search ............................ 395/22, 23, 903, 395/906

[56] References Cited

U.S. PATENT DOCUMENTS

| | | | |
|---|---|---|---|
| 5,113,483 | 5/1992 | Keeler et al. | 395/24 |
| 5,119,468 | 6/1992 | Owens | 395/22 |
| 5,159,660 | 10/1992 | Lu et al. | 395/22 |
| 5,175,678 | 12/1992 | Ferichs et al. | 395/22 |
| 5,203,984 | 4/1993 | Sakai et al. | 395/22 |
| 5,204,872 | 4/1993 | Staib et al. | 395/22 |
| 5,220,373 | 6/1993 | Kanaya | 395/22 |
| 5,250,766 | 10/1993 | Hikita et al. | 187/133 |
| 5,305,230 | 4/1994 | Matsumoto et al. | 395/906 |
| 5,311,421 | 5/1994 | Nomura et al. | 395/22 |
| 5,367,612 | 11/1994 | Bozich et al. | 395/903 |
| 5,402,519 | 3/1995 | Inoue et al. | 395/11 |
| 5,422,983 | 6/1995 | Castelaz et al. | 395/22 |
| 5,428,559 | 6/1995 | Kano | 395/22 |
| 5,471,381 | 11/1995 | Khan | 395/906 |

OTHER PUBLICATIONS

Bleuler et al, "Nonlinear Neural Network Control with Application Example", Inter-Neural Network Conf., IEEE 1990.

Guez et al, "Neural Network Architecture for Control", IEEE Control System Magazine, 1988.

Gupta et al, "Learning and Adaptive Neural Controller", IEEE ICNN, 1991.

Pourboghrat et al, "Neural Network Models for the Learning Control of Dynamical Systems with Application to Robotics", Southern Illinois University, 1989.

Su et al, "Neural Model Predictive Control of Nonlinear Chemical Processes", IEEE Proceeding of the 1993 Inter. Symp. on Intelligent Control, 1993.

Ungar et al, "Adaptive Networks for Fault Diagnosis and Process Control" Computer & Chemical Engineering Journal, Nos. 4–5, pp. 561–572, May 1990.

Bhat et al, "Use of Neural Nets for Dynamic Modeling and Control of Chemical Process Systems", Computer and Chemical Engineering Journal, vols. 4–5, pp. 573–583, May 1990.

(List continued on next page.)

*Primary Examiner*—George B. Davis
*Attorney, Agent, or Firm*—Robert B. Levy

[57] ABSTRACT

Feedback control of a process to reduce process variations is advantageously accomplished by the combination of a signal processor (26) and an artificial neural network (27). The signal processor (26) first determines which of a plurality of process outputs has the greatest deviation from a corresponding desired value for that output. Having determined which of the process outputs has the greatest deviation from its corresponding desired value, the process controller (25) then adjusts the output having the greatest deviation to yield an estimated process output vector $T_m^n$ supplied to the artificial neural network (27) trained to represent an inverse model of the process. In response to the estimated process output vector $T_m^n$, the artificial neural network (27) generates a process control vector $c_n$ that controls the process in accordance with the first order variation between the actual process output and a desired value therefor to reduce process variations.

6 Claims, 3 Drawing Sheets

OTHER PUBLICATIONS

Nadi et al, "Use of Influence Diagrams and Neural Networks in Modeling Semi–Conductor Manufacturing Processes", IEEE Transactions on Semi–Conductor Manufacturing, vol. 4 No. 1 Feb. 1991, pp. 52–58.

Lee et al, "Adaptive Power System Control with Neural Networks", ISCNN Jun. 7–11, 1992, pp. 838–843 vol. 2.

Hinton et al, "Learning Internal Representation by Error Propagation" in the Text Parallel Distributed Processing, Explorations in the Microstructure of Cognition, vol. 1, MIT Press, 1986.

"Supervised Learning and Systems with Excess Degrees of Freedom", COINS Technical Report 88–27, 1988, Department of Computer Science and Information, University of Massachusetts and Amherst Massachusetts.

D. Psaltis, A. Sideris, and A. A. Yamamura, "A Multilayered Neural Network Controller," *IEEE Control Systems Magazine,* Apr. 1988, pp. 17–21.

E. A. Rietman and R. C. Frye, "Neural Control of a Nonlinear System with Inherent Time Delays," ACM Conference 1991, Analysis of Neural Network Applications, ANNA–91, May 29–30, 1991.

FEEDBACK PROCESS CONTROL USING A NEURAL NETWORK PARAMETER ESTIMATOR

This application is a continuation of application Ser. No. 08/134,703, filed on Oct. 12, 1993, now abandoned.

TECHNICAL FIELD

This invention relates to a method and apparatus for accomplishing feedback control of a process using a neural network for estimating process parameters.

BACKGROUND OF THE INVENTION

The manufacture of high quality product on a repeated basis requires accurate control of the manufacturing process. The manufacturing of semiconductor wafers by the well-known planar process is no exception. Among the steps performed to manufacture a semiconductor wafer by the planar process is that of epitaxial layer growth, whereby one of more layers of atoms are grown on the wafer by way of chemical vapor deposition. With silicon semiconductor wafers, epitaxial layer growth is usually carried out by heating the wafer in a reactor while hydrogen and silicon tetrachloride are reacted, or alternatively, while silane is decomposed, to deposit silicon atoms on the wafer.

To obtain high quality semiconductor devices, the thickness of each layer of atoms grown on each of a batch of semiconductor wafers should be substantially uniform. In the past, layer thickness uniformity has been obtained, to the extent possible, by fabricating a sample batch of wafers and then measuring the layer thickness. Adjustments in the process are then made in accordance with differences between the measured layer thickness and a desired thickness value. The steps of: (1) fabricating a batch of a sample wafers, (2) measuring the layer thickness, and (3) adjusting the process parameters, are repeated a number of times until the difference between the measured thickness and the desired layer thickness is within a prescribed tolerance factor.

To obtain more precise control of various manufacturing processes, including the manufacture of semiconductor wafers, neural networks have been employed. Such networks are typically comprised of a plurality of simple computing elements, often referred to as neurons, a number of which function as simple, non-linear summing nodes. These neurons are connected together by links which each weight the signal received from an upstream node. The interconnected neurons attempt to mimic the human brain and thereby provide a mechanism that, in response to a set of inputs, yields one or more process-driving signals which, when applied to the process, cause the process to yield a desired output.

The above-described neural network is trained in accordance with past data. In other words, the weighting provided by the links connecting the nodes of the successive layers is established in accordance with the input to, and output of, the process. When properly trained, the neural network should function as an inverse model of the process. In response to a set of input signals representing a set of process output estimators, the artificial neural network should generate a set of process-driving signals, which, when applied to the process, cause it to produce a set of outputs that more closely approximates a desired set of outputs.

Present-day artificial neural networks are believed to suffer from the disadvantage that such networks are often not very robust with respect to the difference between the input/output relationship of the process estimator and the actual process itself. As a consequence of continuous deviations in the operating characteristics of the process, such artificial neural networks do not operate satisfactorily to achieve a desired state of process operation in a rapid manner.

Thus, there is a need for a technique for achieving feedback control of a process using a neural network which is not subject to the disadvantages of the prior art.

SUMMARY OF THE INVENTION

Briefly, in accordance with the invention, there is provided a technique for achieving feedback control of a process using a neural network. The technique of the invention is initiated by first establishing at least one desired process output, that is, the desired value of the process under optimal conditions. Each actual process output, for which a desired process output has been established, is then measured. A comparison is then made between each measured process output and the corresponding desired process output. From such a comparison, a determination is made as to which of the actually-measured process outputs exhibits the greatest deviation from its corresponding desired process output value. An adjustment is then made in the value of the actual process output exhibiting the greatest deviation from the corresponding desired process output value to yield an estimated process output. The adjustment is made in accordance with: (1) the difference between the actually measured process output and the corresponding desired process output value, (2) the trend in the process output, and (3) the trend in the adjusted process output value. The adjusted (i.e., estimated) process output value is then applied to a neural network which has been trained to provide an inverse model of the process to be controlled. In response to the estimated process output value, the neural network generates at least one process-driving signal for driving the process so that the process produces at least one output more closely approximating the corresponding desired process outputs.

DETAILED DESCRIPTION

Figure 1:
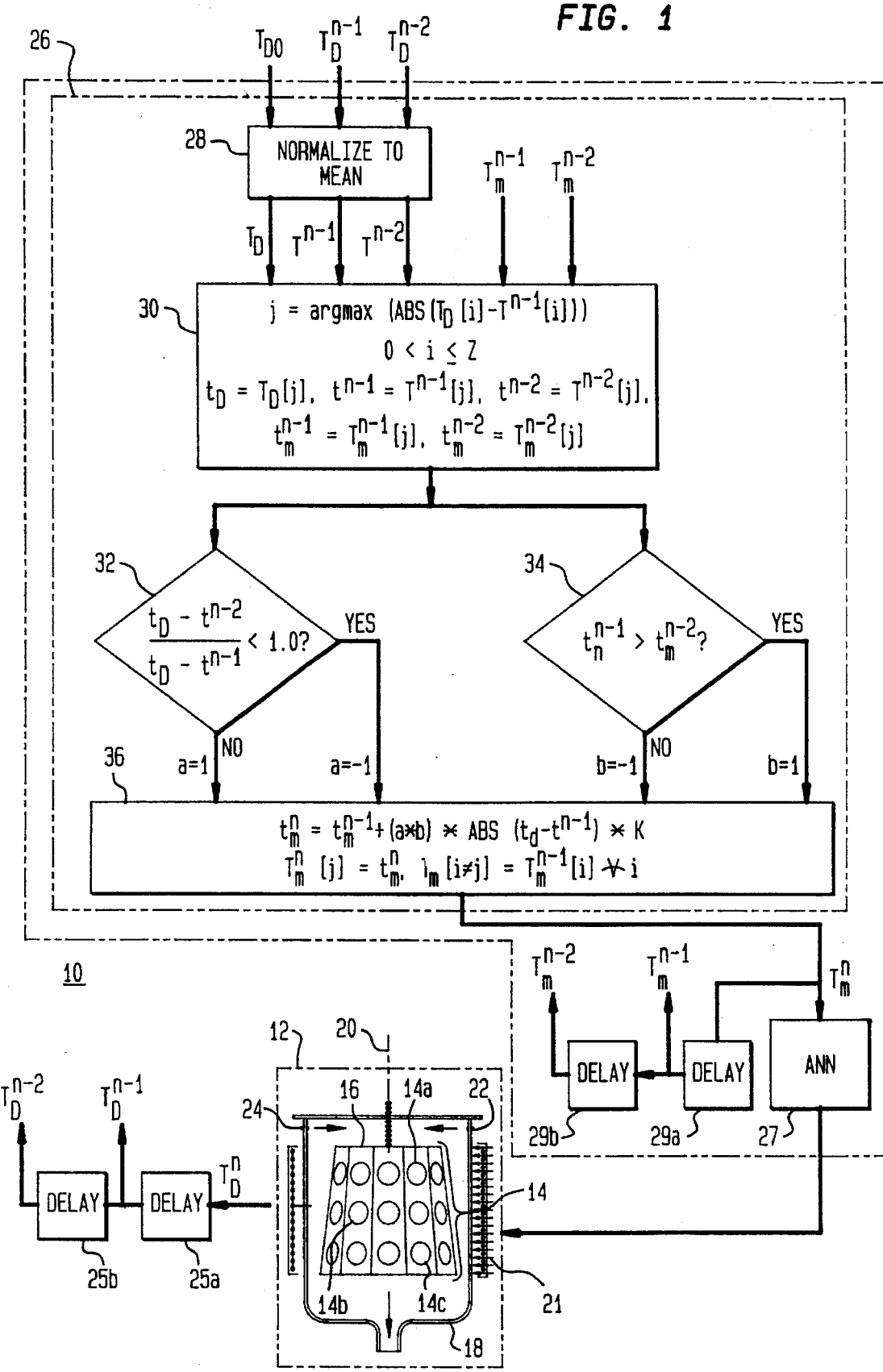
FIG. 1 is a block schematic diagram of a feedback process controller using a neural network estimator in accordance with the invention.

FIG. 1 shows a feedback process controller 10, in accordance with the invention, for controlling a process which, in the illustrated embodiment, comprises a Chemical Vapor Deposition (CVD) process, carried out in a CVD reactor 12, to epitaxially grow atoms on a batch of semiconductor wafers 14. As will be appreciated from a discussion of the controller 10 provided hereinafter, the CVD process practiced by the reactor 12 is only exemplary of the various types of processes that may be controlled by the controller of the invention.

To better understand the manner in which the controller 10 operates, a brief overview of the reactor 12 may prove helpful. Referring to FIG. 1, the reactor 12 comprises a susceptor 16 situated in a glass bell jar 18. The susceptor 16 typically takes the form of a multi-sided body, made from graphite or the like, that is rotated about an axis 19 by way of a motor (not shown). Means (not shown) are provided within the susceptor 16 for heating the susceptor to a temperature at which chemical vapor deposition can occur. Additional means 21, typically in the form of a set of infra-lamps, are provided about the bell jar 18 to further heat the susceptor 16.

On each of the sides of the susceptor 16 is a set of pockets (not shown). In the illustrated embodiment, each side of the susceptor 16 has three pockets, each pocket holding a separate wafer 14a, 14b and 14c, respectively, comprising part of the batch of wafers 14. The pockets holding the wafers 14a, 14b and 14c are located near the top, middle and bottom, respectively, of the susceptor side. While the susceptor 16 of FIG. 1 has been described as having three pockets on each of its sides, the susceptor sides could have a smaller or larger number of pockets to accommodate a smaller or larger number of wafers 14, respectively.

At the upper end of the bell jar 18 is a pair of nozzles 22 and 24 diametrically opposed to each other. Each of the nozzles 22 and 24 is connected to a gas source (not shown) that supplies the nozzle through an adjustable valve (not shown) with a reactant-containing gas, such as hydrogen and silicon tetrachloride, or silane. The nozzles 22 and 24 are each rotatable through both a vertical and horizontal arc, each tangential to a successive one of the sides of the susceptor 16 as the susceptor rotates about its vertical axis 20. The admission of reactant-containing gases into the bell jar 18 through the nozzles 22 and 24 causes atoms to grow on the surface thereof as the reactant-containing gases react upon contact with the heated wafers on the susceptor sides.

To fabricate high quality wafers 14, the layer of atoms grown on the surface of each wafer should have a substantially uniform thickness. Moreover, the layer thickness from wafer to wafer should also be substantially uniform. Accordingly, it is desirable to control the reactor 12 to minimize wafer thickness variation. As discussed in my copending U.S. patent application, Ser. No. 08/011,568, filed Feb. 1, 1993, for "Differential Process Controller Using Artificial Neural Networks," the parameters having the greatest influence on layer thickness variation are: (1) the flow of reactant-containing gases through the nozzles 22 and 24; (2) the horizontal angular orientation of the nozzles 22 and 24, and (3) the vertical angular orientation of the nozzles 22 and 24. The flow of reactant-containing gas through each of the nozzles 22 and 24 is determined by the setting of the valve associated with each nozzle.

To control the reactor 12 in accordance with these three parameters to minimize the layer thickness variation across each of the wafers, the reactor is supplied with a control vector $c_n$ generated at successive intervals (n, n+1, n+2, n+3 ...) by the controller 10 of the invention. The control vector $c_r$ typically contains three components $c^1$, $c^2$, and $c^3$ which are defined as follows:

$$c^1 = \frac{(\text{valve setting nozzle 24} - \text{valve setting nozzle 22}) \times 10}{1/2 (\text{valve setting nozzle 24} - \text{valve setting nozzle 22})} ;$$

$c^2$=angle of each of the nozzles 22 and 24 in the horizontal plane; and $c^3$=angle of each of the nozzles 22 and 24 in the vertical plane.

In accordance with the invention, the vector $c_n$ for controlling the reactor 12 is generated by the controller 10 in accordance with a set of input vectors $T_{DO}$, $T_O^{n-1}$ and $T_O^{n-2}$. The vector $T_{DO}$ contains a set of values representing the desired layer thicknesses for the batch of wafers 14. Since layer uniformity is critical, the components of the vector $T_{DO}$ are all equal. The vectors $T_O^{n-1}$ and $T_O^{n-2}$ each represent actual layer thicknesses measured for each of two sets of wafers 14a, 14b and 14c processed at each of two previous intervals n−1 and n−2, respectively. In practice, each of the vectors $T_O^{n-1}$ and $T_O^{n-2}$ has fifteen separate components representing five separate thickness values for each of the wafers 14a, 14b and 14c, the thickness values for each of the three wafers being measured at the center of the wafer, at each of four points north, east, south and west, respectively, from the center. Given that each of the vectors $T_O^{n-1}$ and $T_O^{n-2}$ has fifteen components, the vector $T_{DO}$ likewise has fifteen components. Depending on the number of wafers 14 seated on each side of the susceptor 16, and the number of thickness measurements for each wafer, the vectors $T_{DO}$, $T_O^{n-1}$ and $T_O^{n-2}$ could contain a smaller or larger number of values.

The vector $T_{DO}$ is supplied to the feedback controller 10 from a very stable signal generator (not shown) whose output is adjustable to allow the desired layer thickness values (as represented by the components of the vector $T_{DO}$) to be varied as required. The vectors $T_O^{n-1}$ and $T_O^{n-2}$ are each generated by a separate one of a set of daisy-chained delay units 25a and 25b, respectively, in accordance with a signal $T_O^n$, representing the actual wafer thicknesses for each of a set of wafers 14a, 14b and 14c processed by the reactor 12 during the interval n. The signal $T_O^n$ is not actually generated by the reactor 12 but by a signal generator (not shown). Although the delay units 25a and 25b are shown as elements separate and apart from the signal processor 26, the delay function provided by the delay units could be accomplished by the signal processor.

The feedback controller 10 of the present invention is comprised of a signal processor 26, responsive to the vectors $T_{DO}$, $T_O^{n-1}$ and $T_O^{n-2}$, for generating a parameter estimator input vector $T_m^n$, and an artificial neural network 27 responsive to the vector $T_m^n$ for generating the control vector $c_n$ for controlling the reactor 12 to minimize layer thickness variations in accordance with the desired process output vector $T_{DO}$. The signal processor 26 typically comprises a general purpose digital computer that will not be described in terms of its hardware configuration. Rather, the signal processor 26 will be described in terms of the program steps which the processor executes in processing the vectors $T_{DO}$, $T_O^{n-1}$ and $T_O^{n-2}$ to yield the parameter estimator input vector $T_m^n$.

As illustrated in FIG. 1, the first step (step 28) executed by the signal processor 26 is to normalize each of the vectors $T_{DO}$, $T_O^{n-1}$ and $T_O^{n-2}$ to the mean layer thickness by establishing the variation of each vector component in terms of the percentage deviation from the mean thickness. For ease of reference, the normalized vectors $T_{DO}$, $T_O^{n-1}$ and $T_O^{n-2}$ are identified as $T_D$, $T^{n-1}$ and $T^{n-2}$, respectively. Since it is not the layer thickness per se, but rather the uniformity of the layer thickness that is of interest, normalizing the vectors $T_{DO}$, $T_O^{n-1}$ and $T_O^{n-2}$ simplifies information processing. As should be appreciated, depending on the process to be controlled, other types of normalization may be appropriate. Moreover, if the process is to be controlled to achieve a specific value, rather than to minimize process variations, the step 28 of normalizing the input vectors to the process controller could be obviated entirely.

Following step 28, step 30 is executed by the signal processor 26. During step 30, the vector $T^{n-1}$ is compared, component by component, to the vector $T_D$ to determine which component of the vector $T^{n-1}$ exhibits the greatest deviation from the desired layer thickness. As shown in FIG.

1, step 30 is carried out by computing the value of j where j is defined by the relationship $$j = \mathrm{argmax}(ABS(T_D[i] - T^{n-1}[i])) \quad (1)$$

where $0 < i < z$, and where z is the number of components in each of the vectors $T_D$, $T^{n-1}$ and $T^{n-2}$.

Since each of the vectors $T_D$, $T^{n-1}$ and $T^{n-2}$ has fifteen separate components as discussed previously, then z is fifteen. However, it should be understood that if the vectors $T_D$, $T^{n-1}$ and $T^{n-2}$ have a larger or smaller number of components, then accordingly, z would be larger or smaller, respectively.

Once the component of the vector $T^{n-1}$ that exhibits the greatest deviation is determined during step 30, then a change amount is added to that vector component to generate the parameter estimator input vector $T_m{}^n$ input to the artificial neural network 27. The change amount is determined in accordance with the following:

(1) the difference between desired layer thickness and the previously observed layer thickness;

(2) the trend in the actual layer thickness (the output of the reactor 12); and (3) the trend in $T_m$, the parameter estimator input vector, representing the adjusted layer thickness value.

To determine the change amount, it is useful, during the execution of step 30, to define the following terms: $t_D$, $t^{n-1}$, $t^{n-2}$, $t_m{}^{n-1}$, $t_m{}^{n-2}$ in the manner given below.

$$t_D = T_D[j] \quad (2)$$

$$t^{n-1} = T^{n-1}[j] \quad (3)$$

$$t^{n-2} = T^{n-2}[j] \quad (4)$$

$$t_m{}^{n-1} = T_m{}^{n-1}[j] \quad (5)$$

$$t_m{}^{n-2} = T_m{}^{n-2}[j] \quad (6)$$

Actual values for the vectors $T_m{}^{n-1}$ and $T_m{}^{n-2}$ are obtained from the vector $T_m{}^n$ via a set of delay units 29a and 29b, respectively, coupled in daisy chain fashion to the output of the signal processor 26.

To establish the exact value of the change amount, each of a pair of steps 32 and 34 is executed following step 30. During step 32, a determination is made whether a first ratio, expressed mathematically by $(t_D - t^{n-2})/(t_D - t^{n-1})$, is less than unity. If so, then a first variable $\alpha$ is set equal to $-1$. Otherwise, the variable $\alpha$ is set equal to 1. As may be appreciated, the ratio $(t_D - t^{n-2})/(t_D - t^{n-1})$ provides a measure of both the difference between the desired layer thickness and the previously measured layer thickness as well as the trend in the actual layer thickness as a function of $T_D$.

During step 34, a determination is made whether the term $t_m{}^{n-1}$, as defined by equation (4), exceeds the term $t_m{}^{n-2}$, as defined by equation (5). If $t_m{}^{n-1}$ exceeds $t_m{}^{n-2}$, then a second variable b is set equal to 1. Otherwise, b is set equal to $-1$.

Having established the values of a and b during steps 32 and 34, respectively, then step 36 is executed, and the variables $\alpha$ and b are utilized to establish the change mount to be added to the component $t_m{}^{n-1}$ to obtain the vector $T_m{}^n$. As illustrated in FIG. 1, the component $t_m{}^n$ of the process estimator vector $T_m{}^n$ is obtained in accordance with the relationship $$t_m{}^n = t_m{}^{n-1} + (a*b) * ABS(t_D - t^{n-1}) * k \quad (7)$$

where k is a constant (typically 0.5) and the vector $T_m{}^n$ is given by the relationship $$T_m{}^n[j] = t_m{}^n \quad (8)$$

$$T_m{}^n[i \neq j] = T_m{}^{n-1} \text{ for all } i, 0 < i \leq z \quad (9)$$

Once the process estimator vector $T_m{}^n$ is established in this manner, the vector is then input to the artificial neural network 27 that, in turn, generates the control vector $C_n$.

Figure 2:
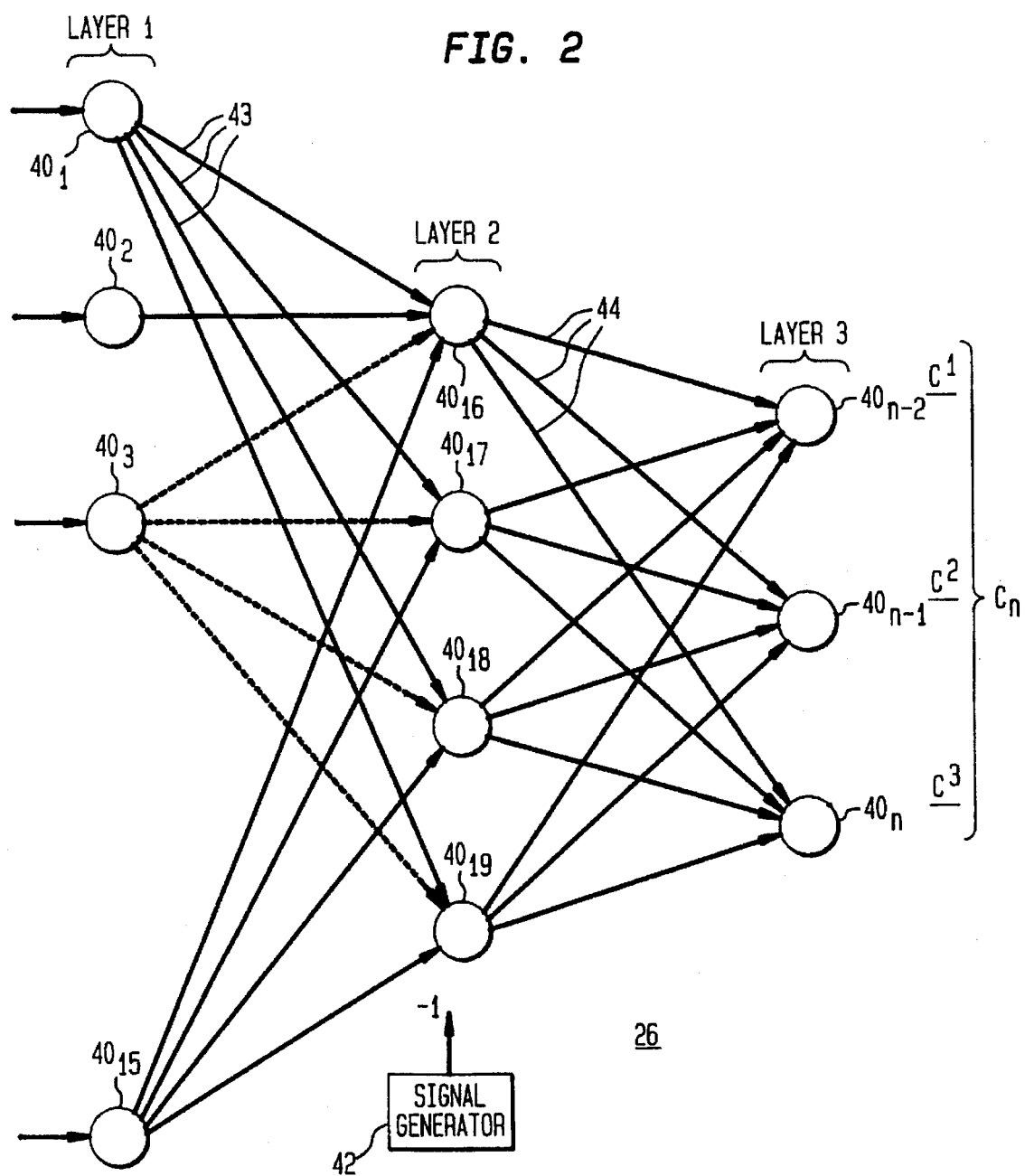
FIG. 2 is a block schematic diagram of the neural network of FIG. 1.

As best illustrated in FIG. 2, the artificial neural network 27 comprises a plurality of neurons $40_1$–$40_n$, (where n is an integer greater than z) arranged in a plurality of layers. In the preferred embodiment, the neurons $40_1$–$40_n$ are arranged in three layers, designated in FIG. 2 as Layer 1, Layer 2 and Layer 3, respectively. The artificial neural network 26 also includes a signal generator 42 that supplies a bias signal of $-1$ to each of the neurons except those in layer 1. Each of the neurons $40_1$–$40_n$ typically takes the form of a computing element capable of summing the input signals supplied thereto, and then transforms the sum of the input signals in a non-linear manner, such as by the use of a sigmoid or tan-hyperbolic function.

Layer 1 of the artificial neural network 27 is comprised of the neurons $40_1$–$40_{15}$, each receiving a separate one of the components of the process estimator vector $T_m{}^n$ generated by the signal processor 26. Each of the neurons $40_1$–$40_{15}$ distributes the received input signal to the neurons in the succeeding layer (Layer 2 in FIG. 2) via a separate one of a set of links 43 that each weight the signal by a separate weighting factor determined from past data in the manner described hereinafter. Layer 2 is comprised of the neurons $40_{16}$–$40_{19}$, each serving to sum the weighted signals received via a separate one of the links 43 with the bias signal from the signal generator 42.

The neurons $40_{16}$–$40_{19}$ then transform the signal sum in a non-linear manner and thereafter distribute the non-linearly transformed signal sum, via a set of links 44, to each of the neurons $40_{n-2}$, $40_{n-1}$, and $40_n$ comprising Layer 3 of the artificial neural network 26. Like each of the links 43, each link 44 operates to weight the signal received via a separate one of the neurons $40_{16}$–$40_{19}$ in accordance with past data.

The weighting provided by each of the links 43 and 44 within the artificial neural network 27 is established by training the network with actual data (i.e., actual layer thickness values) obtained over time or from design experiments. Once a batch of wafers 4 (see FIG. 1) is processed, an error signal representing the difference between the actual process control parameters and the artificial neural network 27 output signal is generated and back-propagated through the network and the connection weights are modified accordingly. Training techniques of this type are well known in the art. See for example the article by G. E. Hinton et al., "Learning Internal Representations by Error Propagation," in the text *Parallel Distributed Processing, Explorations in the Microstructure of Cognition*, Vol. I (MIT Press, 1986), incorporated by reference herein. Another training technique is described in the paper "Supervised Learning and Systems with Excess Degrees of Freedom," COINS Technical Report 88-27, 1988, Department of Computer Science and Information, University of Massachusetts, Amherst Mass., herein incorporated by reference. It may be necessary to retrain the artificial neural network 27 if the actual process shows considerable deviation from the data points included in the training set. It may also be possible to train the network adaptively on a continuous basis, using the most recent runs as the training data points.

To initialize the controller 10, the desired value of the vector $T_{DO}$ is applied to the signal processor 26. The vectors $T_m^{(n-1)}$ and $T_m^{(n-2)}$ obtained from the delay units 29a and 29b are set to the normalized value of $T_{DO}$ if the normalization step 28 is practiced. The output vector $T_m^n$ of of the signal processor 26 is supplied to the input of the neural network 27 that generates the process control signal vector $c_n$. In response to the control vector $c_n$, the reactor 12 processes the wafers 14, ultimately resulting in the output (thickness) vector $T_O$.

In the succeeding iteration, the signal processor 26 uses the actual input vector $T_O^{n-1}$, the delayed value of the vector $T_O$ from the previous run. The input vector $T_m^{n-1}$ is set to the vector $T_m$ generated during the previous iteration. Similarly, the vectors $T_O^{n-2}$ and $T_m^{n-2}$ are replaced with the actual vector values obtained during the previous iteration. With each successive iteration of the process, the process output (thickness) vector $T_O$ should move closer to the desired thickness signal $T_{DO}$.

Under normal conditions, even the largest spread between a successive one of the components of the vector $T^{n-1}$ and the corresponding one of the components of $T_D$, should decrease over time. However, if there is an appreciable difference between the input/output relationship of the artificial neural network 27 and the process carried out by the reactor 12, then it may be possible that after some iteration, the component of $T^{n-1}$ having the largest deviation from $T_D$ will be further from the target (i.e., its corresponding component of $T_D$) than during the last iteration. To avoid this possibility, the manner in which the signal processor 26 operates can be modified, as shown in FIG. 3, to overcome such a local optimum and to search for a more globally optimum value for the components of the parameter estimator vector $T_m^n$.

Figure 3:
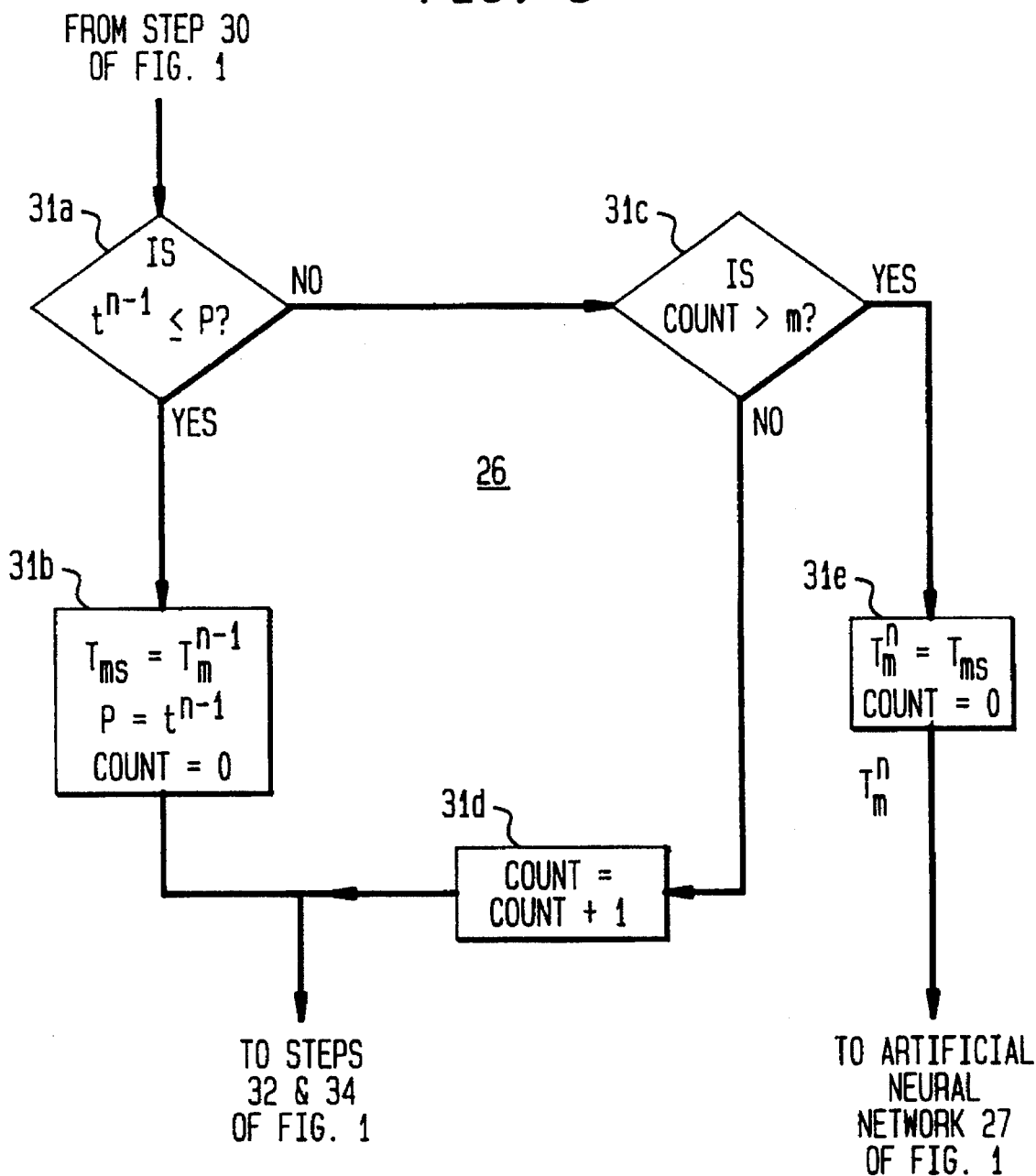
FIG. 3 shows a modification to the feedback process controller of FIG. 1.

Referring to FIG. 3, the pattern of steps executed by the signal processor 26 can be advantageously modified to execute several steps, beginning with step 31a, after executing step 30 and prior to executing steps 32 and 34. During step 31a, which is executed immediately after step 30, a comparison is made between the value of $t^{n-1}$ and a variable P which is initially defined by the relationship:

$$P = \min(\max(ABS\ T_D[i] - T^{n-1}[i])) \qquad (10)$$

where the maximum is for each iteration, and the minimum is for all iterations.

Thus P represents the minimum of the maximum spreads between $T_D$ and $T^{n-1}$.

If during step 31a, $t^{n-1}$ is found to be less than or equal to P, then step 31b is executed and a vector variable $T_{ms}$ is set equal to the vector $T_m^{n-1}$. The vector variable $T_{ms}$ serves to store the best value of $T_m^{n-1}$ input to the artificial neural network 27 of FIG. 1. During step 31b, the value of the variable P is now set equal to the vector component $t^{n-1}$. Also during step 31b, a variable count, which serves as a running count of the number of times step 31a and those following it are executed, is initialized to zero. Following step 31b, steps 32 and 34 of FIG. 1 are executed.

Should the value of $t^{n-1}$ be less than P during step 31a, then step 31c is executed, and the value of the variable count is compared to an integer M. The integer M is selected at the outset of processing to set the number of iterations during which the actual operating point is temporarily allowed to deviate further from the desired operating point while searching for a better outcome than the outcome currently available yet, corresponding to the saved parameter estimator vector $T_{ms}$. While the variable count does not exceed the integer M, then step 31d is executed and the value of the variable count is incremented by one and then steps 32 and 34 of FIG. 1 are executed.

However, once the variable count is found to exceed the integer M, then step 31e is executed at which time, the parameter estimator input vector $T_m^n$ is set equal to $T_{ms}$, the saved parameter estimator input vector. Also, the variable count is reset to zero. The parameter estimator input vector $T_m^n$ established during step 31e is supplied to the artificial neural network 27 of FIG. 1 in place of the value generated during step 36 of FIG. 1.

The foregoing describes a technique for achieving feedback control of a process, such as a chemical vapor deposition process practiced by a reactor 12, using an artificial neural network 27. The technique of the invention is robust with respect to the difference between the input/output relationship of the parameter estimator (i.e., the artificial neural network 27) and the actual process provided that the operating point of the estimator is not very far from that of the process itself. Moreover, the control technique of the invention has the capability of converging quickly to the desired state because the technique makes use of the trend of the measured process output $T_O^n$ and that of the parameter estimator input vector $T_m^n$.

It is to be understood that the above-described embodiments are merely illustrative of the principles of the invention. Various modifications and changes may be made thereto by those skilled in the art which will embody the principles of the invention and fall within the spirit and scope thereof. While the above invention has been described as employing a neural network for estimating the process control signal input(s), other devices could be employed to accomplish such estimation.

I claim:

1. A method for achieving feedback control of a physical process having a plurality of inputs and outputs for causing each process output to have an actual value that more closely approximates a desired value therefor, the method comprising the steps of:

(a) generating the desired value for each process output;

(b) measuring the actual value for each process output;

(c) comparing each actual process output value to the corresponding desired value for that process output to determine which process output exhibits a greatest deviation of its actual value from its corresponding desired value;

(d) generating an estimated process output value for that process output having the greatest deviation of its actual value from its corresponding desired value, the estimated process output value being generated in accordance with: (i) a difference between the actual value of each process output and the corresponding desired value for that process output, (ii) a trend in the actual value of each process output, and (iii) a trend in the estimated process output value;

(e) generating a process control vector signal in accordance with the estimated process output value by applying the estimated process output value to a neural network that represents an inverse model of the physical process; and (f) controlling the physical process in accordance with the process control vector signal to cause the process output to more closely approximate their corresponding desired values.

2. The method according to claim 1 wherein the steps of (a)–(f) are continuously repeated.

3. The method according to claim 1 further including the step of normalizing the desired process output and the actual process output.

4. Apparatus for accomplishing feedback control of a process having a plurality of inputs and outputs, each having an actual value, comprising:

means for comparing each actual value of each output of the process to a desired value for that process output to determine which actual output value deviates from its corresponding desired value by a greatest amount;

means for determining an estimated process output value corresponding to a process whose actual value is found to have the greatest deviation from the corresponding desired value, the estimated process output value being generated in accordance with: (i) a difference between the actual value of each process output and corresponding desired value for that process output, (ii) a trend in the actual value of each process output, and (iii) a trend in the estimated process output value;

means for generating a process control vector signal in accordance with the estimated process output value and the actual process output values; and an estimator trained to represent an inverse model of the process and responsive to the process control vector signal for generating a vector signal for application to the process for controlling the process to cause each of the output values of the process to more closely approximate the corresponding desired process output values.

5. The apparatus according to claim 4 wherein said means for comparing, means for determining and means for generating collectively comprise a computer.

6. Apparatus for accomplishing feedback control of a chemical vapor deposition reactor that processes semiconductor wafers to minimize wafer layer thickness variations, comprising:

means for normalizing a first vector, whose components represent desired wafer layer thicknesses, a second vector whose components represent actual wafer layer thickness measured during a first interval; and a third vector whose components represent actual wafer layer thicknesses measured during a second interval;

means, responsive to the normalized first and second vectors, for determining which of the components of the second vector exhibits a greatest deviation from a corresponding component of the normalized first vector, means, responsive to the normalized first, second and third vectors, for determining a change amount to be added to that component of the normalized second vector exhibiting the greatest deviation to yield an estimated process output vector, the estimated process output vector being established in accordance with: (i) a difference between the normalized second vector, and the normalized first vector, (ii) a trend in the actual process output, as determined from the second and third normalized vectors, and (iii) a trend in the estimated process output vector; and an artificial neural network, responsive to the estimated process output vector, for generating a control signal for application to the reactor for controlling the reactor to reduce variations in the wafer layer thickness.

\* \* \* \* \*